Aug. 12, 1958     W. F. HENNESSEY     2,846,975
SELF-CLEANING CONVEYOR
Filed June 26, 1956
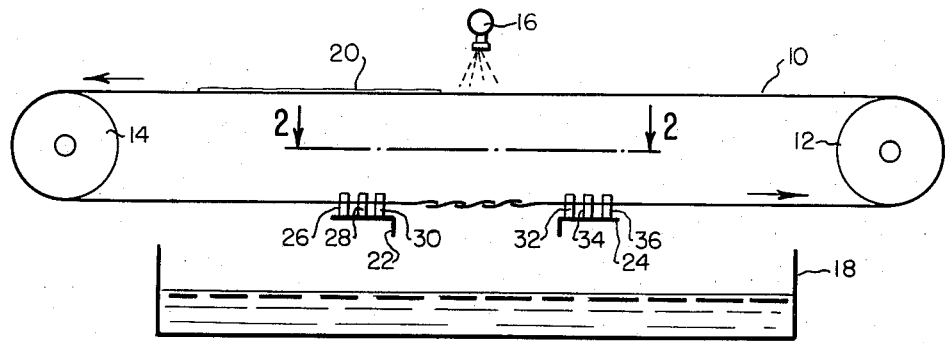
Fig. 1
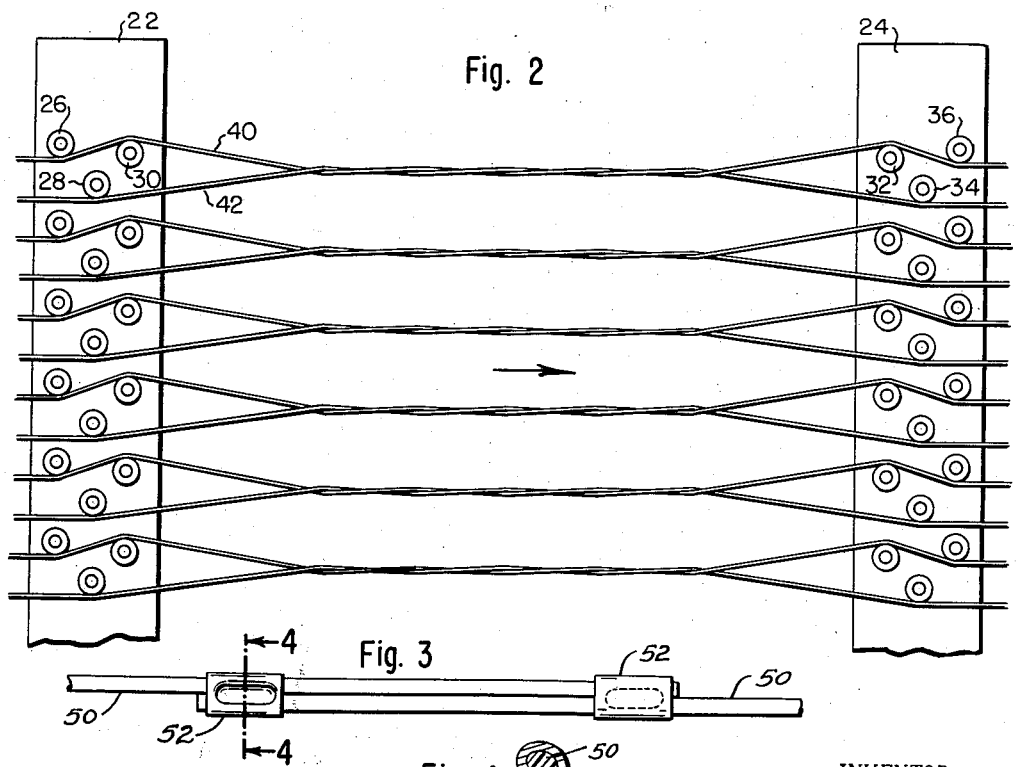
INVENTOR.
WILLIAM F. HENNESSEY
BY Kenway, Jenney,
Witter & Hildreth
ATTORNEYS

United States Patent Office 2,846,975
Patented Aug. 12, 1958

2,846,975

SELF-CLEANING CONVEYOR

William F. Hennessey, Ipswich, Mass., assignor to Boyle Machine & Supply Co., Inc., Peabody, Mass., a corporation of Massachusetts Application June 26, 1956, Serial No. 594,004

3 Claims. (Cl. 118—324)

My invention relates to conveyors and particularly to conveyors for carrying hides and similar articles beneath a spraying apparatus where lacquer, paint or other finishes are applied.

In the spray finishing of hides there is considerable fire hazard resulting from the attendant dispersion of inflammable materials on and around the conveyors used to carry the hides beneath the spray nozzles. It has also proved troublesome to clean the conveyors so that different finishing substances may be used sequentially on the same apparatus.

The most important object of my invention is to improve the safety with which hides and other articles may be spray coated.

Another object of my invention is to improve the efficiency of conveyors used in conjunction with spray finishing.

Another object of my invention is to reduce the cost of cleaning conveyor belting which becomes fouled with accumulations of finishing compounds such as lacquers, paints, resins, etc.

In the past it has been found that a conveyor formed of parallel endless loops of nylon filaments may be cleaned more effectively than belts of conventional form, since accumulated deposits may more readily be stripped off. However, it has been necessary to provide the return run of such nylon belts with relatively costly water sprays, rotary brushes, and rotary paddles.

The most important feature of my invention is based on the discovery that if adjacent filaments are twisted together through part of the run, the rubbing and turning action of the meeting filaments will strip off surface deposits with astonishing ease. A trough below the twisted portion may easily be arranged to collect the droppings and confine them.

These and other objects and features of the invention will be more readily understood and appreciated from the following detailed description of a preferred embodiment thereof selected for purposes of illustration and shown in the accompanying drawing:

Fig. 1 is a somewhat schematic view in side elevation of a conveyor constructed in accordance with the invention, Fig. 2 is a plan view of a portion of the return run of the conveyor as indicated in the line 2—2 of Fig. 1, Fig. 3 is a plan view of the connection between the ends of a filament, Fig. 4 is a view in cross-section along the line 4—4 of Fig. 3, and Fig. 5 is a plan view showing an alternative mode of connecting the ends of a filament.

As best appears in Fig. 1 the conveyor generally includes a belt 10 composed of a multiplicity of endless nylon filaments arranged in parallel array and looped over opposed pulleys 12 and 14, one or both of which may be driven. Poised above the top of the conveyor is a spray head 16 by means of which various finishing materials such as lacquers, paints and resins may be sprayed upon objects, such as the hide shown at 20, in order to apply a finish coat or surface. Beneath the lower or return run of the conveyor there is provided a receptacle or trough 18 of suitable dimensions arranged to catch the droppings from the conveyor.

Disposed athwart the return run of the conveyor is a pair of spaced brackets 22 and 24, each serving to support a number of groups of idler rollers, and as will be seen, adjacent filaments 40 and 42 are twisted together as they pass through the space between the brackets 22 and 24. The mounting of the rollers on each of the brackets is the same, and the cleaning device of my invention is therefore not uni-directional. If it be assumed that the return run of the conveyor is moving from left to right of Fig. 2, the purpose of the rollers on the bracket 22 is to guide the filaments so that adjacent pairs can be twisted together without disturbing the parallel spacing of the filaments before they reach the bracket 22. On the other hand the function of the rollers on the bracket 24 is to guide the untwisting filaments back into proper spaced parallel relation.

Referring to the rollers on bracket 22, each pair of filaments which are to be twisted requires three rollers, and it will be understood that a description of the rollers associated with the upper two filaments 40 and 42 of Fig. 2 also describes the operation of the succeeding lower pairs of filaments of the figure. The upper filament 40 first encounters a roller 26 and the lower filament 42 first encounters a roller 28, these rollers serving to maintain the parallel spaced relation of the filaments 40 and 42 prior to their twisting. A third roller 30 is positioned to encounter the oncoming filament 40 and keep it from touching the roller 28 as the filament 40 goes into twisted relation with the filament 42. Were it not for the roller 30, the filament 40 would not only bear on the roller 28, but also leave the roller 26, and the spacing of the filaments would therefore be incorrect. After the filaments 40 and 42 have passed over the rollers 28 and 30, they are twisted upon one another perhaps four or five times, the number of twists not being particularly critical.

The filaments 40 and 42 then pass out of their twisted relationship, the filament 40 being led over a roller 32 while the filament 42 passes over the roller 34. The rollers 32 and 34 operate to separate the twisted filament and space them. Then the filament 40 encounters a third roller 36 which guides it into proper spaced parallel relationship with the filament 42.

It should be observed that the three rollers in each group are not only spaced apart in a transverse sense of the conveyor but also in a longitudinal sense, the reason being that it is not desirable to space the rollers too closely together, since it has been found in operation that finishing material may build up on the surfaces of the rollers with the result that the space between them gets filled up and the rollers interfere with each other and stop turning. It is important that all of the rollers be free to turn, inasmuch as a filament would otherwise very quickly cut into the surface of a roller and ruin it.

As the conveyor is operated, the adjacent filaments pass into and out of twisted relationship, the result being that the rotation of the filaments against each other during their passage between the brackets 22 and 24 causes any material disposed on the surfaces of the filaments to strip off and drop into the collector 18.

For facilitating the removal of certain kinds of finish materials, I have employed a drier associated with the return run of the conveyor so that the filaments 10 pass through the drier before being twisted together.

While I have shown and described one pair of brackets providing a single cleaning twisting, it is within the purview of the invention to add one or more additional pairs of brackets and rollers and thus provide a plurality of zones in which the filaments may be twisted together.

Although, as I have stated, material for the filaments is preferably nylon, the invention may also successfully be practiced with filaments of other materials, such as synthetic plastics, metal wire, cord, or the like.

For the successful operation of the device thus far described it is necessary that the ends of the loops of filamentary material be so connected together as to permit ready passage about the several rollers which are of necessity of relatively small diameter. I have shown in Figs. 3, 4 and 5 a clip which has proved extremely satisfactory in service. As shown in Fig. 3 the ends of a filament 50 are brought into overlapping parallel relationship and held together by means of a pair of metal clips. Each clip 52 is in the form of a short section of metal sleeving crimped inwardly between the adjacent ends of the filament. In the operation of crimping the clip, the pressure is exerted to force opposed portions of the sleeve inwardly between the two pieces of filament. In this way no sharp edge is caused to bear on either of the filaments, but both of them are very tightly gripped and embraced by the encircling portions of the sleeve or clip 52.

Whereas I have shown in Fig. 3 two clips joining together the closely spaced parallel ends of a filament 50, in Fig. 5 I have shown an equally satisfactory alternative, also using two clips. As shown in Fig. 5 the end of each filament is looped back upon itself and the loops are interlinked. A clip 52 grips the shank of each loop and preserves the connection of the end of the filament.

Having thus disclosed my invention, what I claim as new and desire to secure by Letters Patent of the United States is:

1. Spray coating apparatus comprising a spray head, a plurality of endless filaments, a plurality of sheaves arranged to support said filaments in looped array having an upper conveying run disposed beneath said spray head and a lower return run, spaced idler rolls associated with each filament and mounted adjacent the lower run, adjacent filaments being twisted together in pairs between said spaced idler rolls but in parallel array throughout the upper run, and a trough disposed beneath said lower run.

2. Spray coating apparatus comprising a spray head, a plurality of pairs of endless nylon filaments arranged in looped array having an upper conveying run disposed beneath said spray head and a lower return run, sheaves serving said filaments to drive them through a looped path, two spaced sets of idler rolls associated with each pair of filaments at the lower return run, each set of idler rolls comprising three spaced rolls, the pair of filaments being twisted about each other between the sets of idler rolls, two of the rolls of each set being mounted to space the filaments a predetermined distance apart and the third roll of each set being offset from the other two to restrain one of the filaments from leaving one of the other two rolls.

3. The structure defined in claim 2 wherein the sets of idler rolls disposed at the lower run of the filaments are mounted on a pair of spaced brackets disposed transversely beneath the lower run.

References Cited in the file of this patent

UNITED STATES PATENTS

| | | |
|---|---|---|
| 2,155,553 | Jones | Apr. 25, 1939 |
| 2,360,257 | Muller et al. | Oct. 10, 1944 |
| 2,717,215 | Faulkner | Sept. 6, 1955 |